(12) United States Patent
Freimann et al.

(10) Patent No.: US 12,557,804 B2
(45) Date of Patent: Feb. 24, 2026

(54) METHOD AND DEVICE FOR MINIMIZING THE RISK OF FIRE AND USE OF A DEVICE SUITABLE THEREFOR

(71) Applicant: ZASSO GROUP AG, Zug (CH)

(72) Inventors: Christopher Freimann, Eschweiler (DE); Sergio De Andrade Coutinho Filho, Indaiatuba (BR)

(73) Assignee: ZASSO GROUP AG, Zug (CH)

( * ) Notice: Subject to any disclaimer, the term of this patent is extended or adjusted under 35 U.S.C. 154(b) by 448 days.

(21) Appl. No.: 17/761,595

(22) PCT Filed: Sep. 17, 2020

(86) PCT No.: PCT/EP2020/076007
§ 371 (c)(1),
(2) Date: Mar. 17, 2022

(87) PCT Pub. No.: WO2021/053086
PCT Pub. Date: Mar. 25, 2021

(65) Prior Publication Data
US 2022/0369616 A1　　Nov. 24, 2022

(30) Foreign Application Priority Data

Sep. 18, 2019　(DE) ..................... 10 2019 006 544.1

(51) Int. Cl.
*A01M 21/04*　　(2006.01)
(52) U.S. Cl.
CPC ................................. *A01M 21/046* (2013.01)
(58) Field of Classification Search
CPC .... A01M 21/046; A01M 15/00; A01M 21/04; A62C 3/07; A62C 8/06; A62C 3/0257

USPC .......................................................... 169/46
See application file for complete search history.

(56) References Cited

U.S. PATENT DOCUMENTS

| | | | | | |
|---|---|---|---|---|---|
| 479,448 | A | * | 7/1892 | McKay ..................... | A62C 8/06 |
| | | | | | 160/229.1 |
| 3,698,380 | A | * | 10/1972 | Cook ..................... | A01M 15/00 |
| | | | | | 126/271.2 A |
| 3,919,806 | A | * | 11/1975 | Pluenneke .......... | A01M 21/046 |
| | | | | | 47/1.3 |
| 4,088,122 | A | * | 5/1978 | Miles ..................... | A01M 15/00 |
| | | | | | 126/271.2 C |

(Continued)

FOREIGN PATENT DOCUMENTS

| | | | | |
|---|---|---|---|---|
| CA | 3057773 | A1 | 5/2019 | |
| EP | 3545760 | A1 * | 10/2019 | ............. A01B 39/18 |
| FR | 2497633 | A2 * | 7/1982 | |

OTHER PUBLICATIONS

International Search Report with Written Opinion for PCT/EP2020/076007 dated Jan. 11, 2021.

*Primary Examiner* — Katelyn T Truong
(74) *Attorney, Agent, or Firm* — Hahn Loeser & Parks LLP; John J. Cunniff

(57)　　　　ABSTRACT

A device for minimizing the risk of fire in weed control applications, provides that arcs are detected by analyzing characteristic partial discharge or current and voltage values, which are prevented by round, channel-less geometries, the use of a depth electrode or the use of high ground contact pressures, which are extinguished by extinguishing mats or liquid spraying on the treated and/or surrounding surface before, during or after the high voltage treatment.

13 Claims, 8 Drawing Sheets

(56) References Cited

U.S. PATENT DOCUMENTS

Figure 1:
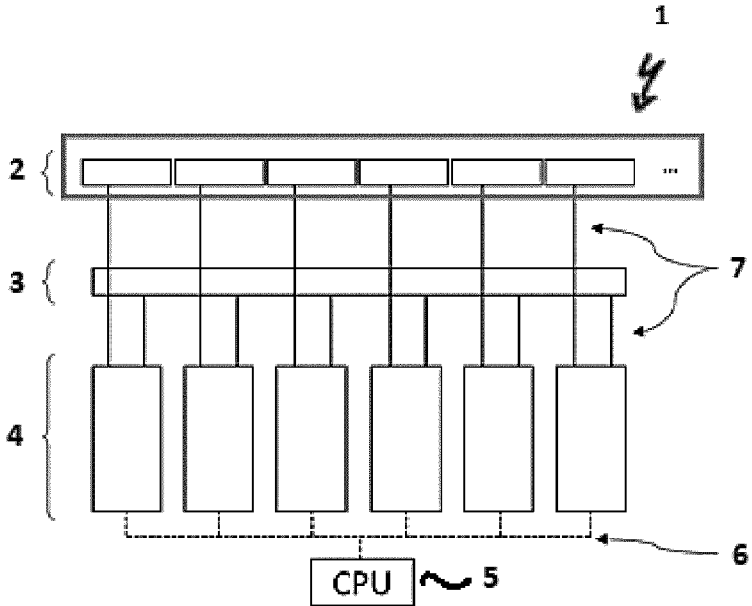

|  |  |  |  |  |  |
|---|---|---|---|---|---|
| 4,177,603 | A | * | 12/1979 | Dykes | A01M 21/046 |
|  |  |  |  |  | 47/1.3 |
| 4,257,190 | A | * | 3/1981 | Dykes | A01M 21/046 |
|  |  |  |  |  | 47/1.3 |
| 4,869,235 | A | * | 9/1989 | Miles | A01M 21/04 |
|  |  |  |  |  | 126/271.2 R |
| 5,894,893 | A | * | 4/1999 | Nelson | A62C 27/00 |
|  |  |  |  |  | 169/52 |
| 10,136,632 | B2 | * | 11/2018 | Yamamoto | F23D 14/56 |
| 2006/0265946 | A1 |  | 11/2006 | Schwager |  |
| 2016/0050902 | A1 | * | 2/2016 | Crisp | A01M 19/00 |
|  |  |  |  |  | 43/124 |
| 2018/0055036 | A1 | * | 3/2018 | Diprose | A01H 3/04 |
| 2018/0325091 | A1 | * | 11/2018 | Kroeger | A01M 21/046 |
| 2022/0202004 | A1 | * | 6/2022 | Voelkening | A01M 21/046 |

* cited by examiner

81

82

85

86

87

83

84

90

Geometry a

91

Geometry b

METHOD AND DEVICE FOR MINIMIZING THE RISK OF FIRE AND USE OF A DEVICE SUITABLE THEREFOR

The invention relates to a method and apparatus for minimizing the risk of fire when working with electrodes from a soil with weeds, weed control applications and the use of a suitable device for this purpose.

The invention is based on the task of reducing the risk of fire by simple means and procedures. This is achieved with the methods and devices specified in the patent claims. Advantageous design variants are the subject of the sub-claims.

A partial exceeding of the breakdown field strength of an area insulated with air leads to a partial discharge activity depending on the material parameters. The extent to which a high-voltage arrangement is partially discharged depends not only on the electrical parameters but also on the geometry. The more in-homogeneous an arrangement is, the more likely it is to be partially discharged. For applications with high voltage on naturally grown substrates, a partial discharge activity is to be expected due to the high inhomogeneity of the substrate. Before the generation of arcs, the partial discharge activity increases in a strongly inhomogeneous arrangement. The partial discharge activity can therefore be used as an indicator for a subsequent arc discharge. By analyzing the partial discharge activity in combination with an influence on the high voltage, such as a short-term cut-off of the high voltage, the arcing can be reduced by taking the necessary energy before a plasma channel is formed.

High voltage is defined here as a high voltage that is used to introduce a sufficiently high amount of energy into the ground to achieve positive weed control. This includes in particular also voltage<1 kV.

The electric field component (typically in the 300 MHz-3 GHz range) of a partial discharge pulse is detected by capacitive sensors. A galvanic connection to the high-voltage electrical conductor is not required. A UHF sensor essentially consists of a broadband antenna suitable for the UHF frequency range emitted by the partial discharge pulse.

A sensor electrode can be designed as a conductive band in the form of a cylindrical sheath around the cable core. The sensor electrode acts together with an outer shield of the cable as capacitance. The result is a capacitive voltage divider consisting of cable and sensor, which makes it possible to decouple pulse-like signals from the power cable or the set. If no cable shield is used, the cylinder sensor can also be mounted around the cable insulation. In addition, an air gap or a second solid insulation can be used between the cable insulation and the sensor.

External influences can be reduced by shielding the sensor.

By using several UHF sensors, each installed at a different location near the high voltage circuit, troubleshooting can be performed.

In principle, acoustic or optical measuring methods can also be used.

The fire risk can also be minimized by detecting an arc and subsequently limiting the current or reducing the voltage.

The discharge process during arc generation can be described characteristically by the ratio of current and voltage between two electrodes.

By evaluating the output values such as current and/or voltage of at least one high-voltage source, information from characteristic processes can be used to detect the arc and provide the information to the system. A detection can then lead to a switch-off of the high voltage or be made available as a parameter for soil analysis. By analyzing the arc intensity and number of arcs, different substrates can be categorized, which in particular can be used to identify soils outside of the application area and, if necessary, reported to the operator. The safety relevance is guaranteed in particular by the fact that longer lasting arcs can be detected in order to bring the system into a safe condition automatically or by measures taken by the operator. These longer-lasting arcs can be caused, for example, by larger branches or other objects getting caught in the high-voltage area or the high-voltage insulation failing.

Limiting the current of the high voltage source can prevent the current required for an arc from being supplied by the source.

In a modular high-voltage source design, one pole is always bridged to avoid series connection of voltage sources due to inhomogeneity's of the substrate. In this case the voltage of several sources would add up and lead to unacceptably high voltages for the insulation.

Due to the single-pole bridging, the current limitation of the individual modules only affects the unbridged poles or electrodes. With the bridged electrode, the total current of the high-voltage circuit is distributed depending on the inhomogeneity of the substrate. The maximum current for an arc at the bridged electrode is calculated:

$$I_{max\ arc} = \text{Number of modules} * I_{max\ Modul}$$

To avoid high local currents at the bridged electrode, the coupling of the electrode(s) to the substrate is crucial. Electrodes with lowest possible ground resistance, high contact area to the substrate and possibly with field control electrodes are used. A further current distribution can be achieved by a redundant design with several electrodes per bridged pole.

To reduce the arc, electrodes with as few sharp edges as possible are used. At edges and tips, the local electric field strength is high, which leads to partial discharges, glow discharges, sliding discharges or finally to arcing.

A key factor for the arc is the potential difference between the high voltage electrode and the ground. To reduce the voltage of the electrodes, deep soil layer electrodes can be used by bypassing the plant resistance and thus reducing the total resistance to be bridged.

Due to the highly inhomogeneous geometries in the coupling of the electrodes to the plant and the soil, different, partially combinable solutions are proposed. With a field control electrode the local field strength and thus the number and intensity of the arcs can be reduced. In the following, solutions for the so-called nonlinear and geometric field control are presented. To further reduce the electric field strength, the electrodes are pressed to the ground. For this purpose, contact pressures of the electrodes on the ground are defined. By an improved coupling of the electrodes to the ground, the local potential increase of the ground can be used to reduce critical field strengths. In addition to the increased contact pressure, a better connection of the electrodes to the plants can also be achieved by reducing the relative speed between electrode and plant and by spraying the substrate with water before the high voltage treatment.

When using split electrodes (e.g. to increase flexibility), the field control can also be split so as not to impair the flexible soil adaptation function.

With the help of a geometric field control, the electrode potential can be directed to the substrate. The geometric shape stretches the potential and smoothes the electric field strength. A wedge-shaped conductive material is attached to the end of the electrode. As a field control element, another sheet is attached to the wedge so that the distance to the substrate is continuously increasing. By using a curvature (e.g. Rogowski profile) the electric field can also be homogenized.

By using cutting electrodes within the high voltage circuit, the impedance of the voltage source as a load can be reduced by a low ground resistance. This allows a higher current flow compared to electrodes with higher ground resistance and increases the biological performance of the application. In addition, cutting elements offer a lower fire hazard due to their good coupling to the ground.

Figure 10:
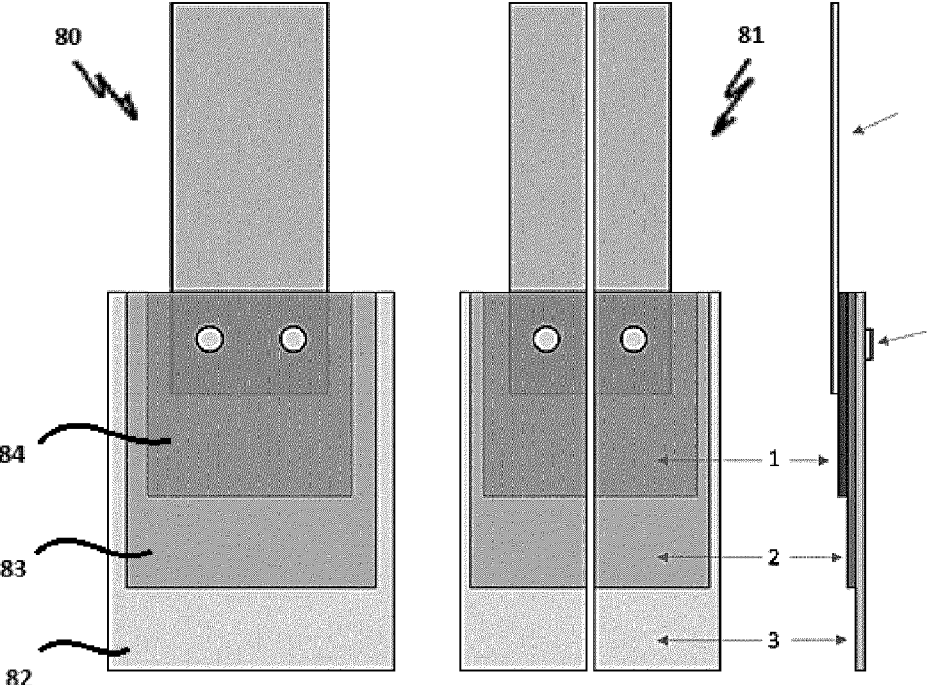

Nevertheless, when used with a dry substrate, light arcs can occur between the cutting element and the soil or vegetation. This is due to a high local electric field strength in the area between the cutting element and the soil surface. To reduce the local field strength, field control electrodes can be used, which are partly located below the surface and attached to the cutting elements. FIG. 10 shows examples of geometries. The field control electrodes are either made of the same material as the cutting elements or of more flexible material, because less mechanical forces are expected behind the cutting element.

The application by means of high voltage may only be carried out during operation. This makes unwanted direct contact with the electrodes more difficult and prevents the risk of fire. Modern tractors are equipped with a speed sensor that can transmit a signal to attachments. Since this signal can be either missing or defective, it is desirable to implement a motion detection system that is independent of the carrier vehicle.

Radar sensors can detect movement in close proximity if this movement takes place in the area observed by the sensor. Radar sensors that can be used here are also used for automatic doors on escape routes. Since they are usually evaluated components, it is recommended to design them redundantly.

GPS and acceleration sensors such as XYZ-axis acceleration sensors can also be used to determine the position and thus to analyze the vehicle speed.

Wheels on the ground in front of, behind or on one side of the system can also be used for speed analysis. On substrates where increased arcing is expected, the substrate can be sprayed with water before application. This reduces the arc and increases the biological effect by reducing the impedance between the plants and the electrode. To extinguish fire after treatment, spraying water after treatment can be used. This can be used either as a blanket treatment or selectively. Camera systems with image recognition or temperature evaluation can be used for targeted fire fighting.

When spraying water near open high voltage electrodes, a sufficiently large distance between the spray head and the high voltage electrode is required. In principle, spraying water before or after HV treatment can be carried out with a separate vehicle.

For fire fighting, fire protection mats can be used after the ignition of potential fires, which are drawn behind the high voltage electrodes. As the fires spread over time, the width of the fire mats depends mainly on their positioning. The further away from the high voltage electrodes a fire mat is located, the wider it must be. In principle, the width of the mats should be greater than the total width of the electrodes. The following figure shows different placements for extinguishing mats that can be pulled behind the electrodes.

The placements also depend on whether the actual high voltage treatment takes place in front of or behind the vehicle.

It is advantageous to use a measuring method to determine the contact pressure of an electrode on the substrate and to compare different electrodes. This measuring method is valid for mobile systems as well as for stationary or portable systems. For this purpose the electrode or several electrodes are mounted in the complete system intended for the application. The complete system is initially in a state in which the application is used according to the operating instructions. All moving parts of the frame are in the target position. If the pressure that at least one electrode exerts on the substrate is adjustable, the pressure is set to the maximum adjustable value (or state). If it is a handheld device, no additional weight is added to the weight of the system. The at least one electrode is at the intended angle to the substrate. If the angle is variable or not defined, the angle that results in the maximum pressure of the electrode on the substrate is used. No voltage is applied to the electrodes. The system is stationary. It is measured on a flat surface. Under the electrode there is a commercially available and calibrated scale/balance (e.g. plate or formed plate skala), which measures the total contact area of at least one electrode. The electrode is not above the edge of the scale and does not move. Each electrode in the overall system is measured individually or together. There is at least one electrode per measurement on the scales. The scale can have a maximum height of 150 mm (distance floor to contact surface). The scale can also be higher. If the scale is higher, the working height of the electrodes is adjusted in relation to the upper surface (plateau) of the scale.

Preferably, electrodes are used (independent of geometry) which apply a weight force of more than 15 N.

Since it is absolutely necessary to short-circuit the electrodes to prevent accidents, it is suggested that the electrodes be short-circuited by means of a manually operated insulated rod, a high-voltage switch or another high-voltage circuit. This will prevent sparks and possible human accidents before and/or after use of the device.

It is advantageous when a high-voltage-side current and/or voltage measurement is used to detect arcs.

It is advantageous when the high voltage is automatically switched off as soon as the relative speed between the high voltage electrode and the substrate exceeds or falls below a limit value.

It is advantageous when rounded electrode geometry surfaces directed towards the ground or weeds are used or round electrodes are used which have no edges or points on the surface to which the plants approach or touch.

Several design examples are shown in a drawing and are described in more detail below. It shows FIG. 1 an arrangement of a modular high voltage source, FIG. 2 an electrode without edges, FIG. 3 a sample electrode, FIG. 4 a deep soil layer electrode, FIG. 5 an area with the highest electric field strength at the ends of the electrode plates for observing two different geometries of the electrode, FIG. 6 a first electrode arrangement, FIG. 7 another electrode arrangement, FIG. 8 shows a nonlinear field control (top view left angular and rounded; bottom view right), FIG. 9 a nonlinear field control when using split electrodes; with and without rounding, FIG. 10 a use of several layers (e.g. three layers), FIG. 11 a geometric field control; from left: electrode view from below, above, laterally straight, laterally bent, FIG. 12 an electric field control for deep soil layer electrodes, FIG. 13 an electric field control for cutting elements such as discs, FIG. 14 a radar sensor positioning, FIG. 15 an improvement in the coupling of the electrode to the plants through contact pressure, FIG. 16 shows a high-voltage area at the rear of the vehicle with an extinguishing mat between the high-voltage area and the vehicle, FIG. 17 a high-voltage area at the front of the vehicle with a fire extinguishing mat immediately behind the high-voltage area, FIG. 18 a high voltage area at the front of the vehicle with a fire extinguishing mat behind the vehicle, FIG. 19 a high-voltage area at the front of the vehicle and a fire extinguishing mat in front of and behind the vehicle, and FIG. 20 a manually operated short circuit device.

FIG. 1 shows how in a modular design of the high voltage source 1 one pole is bridged to avoid series connection of voltage sources due to inhomogeneities of the substrate. In this case the voltage of several sources would add up and lead to unacceptably high voltages for the insulation. FIG. 1 shows the separation of electrodes 2, which can be designed as a positive pole, and an electrode 3, which is designed as a negative pole or bridged pole, for example. High voltage converter modules 4 are connected to electrodes 2 and 3. A central CPU 5 is connected to the high-voltage converter modules 4 via communication and control paths 6 and the high-voltage converter modules 4 are connected to the electrodes 2, 3 via high-voltage connections 7.

Figure 2:
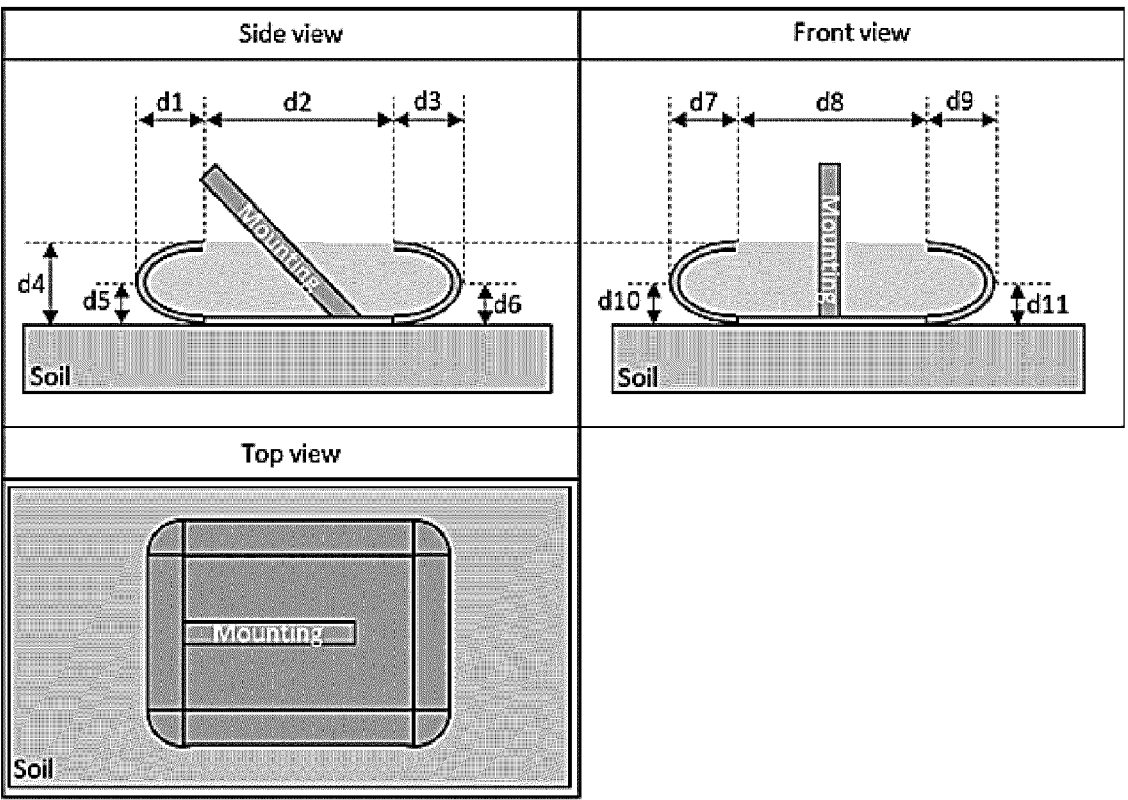

FIG. 2 shows a general electrode shape without edges as side view, front view and top view. For this purpose, sheets are formed and connected elliptically. The distances d1 to d11 are design parameters. Depending on the choice of parameters, different shapes can be achieved:

e.g. sphere with diameter x:

$$d1=d3=d5=d6=d7=d9=d10=d11=d4/2=x/2$$

$$d2=d8=0m$$

e.g. hemisphere with diameter x:

$$d1=d3=d5=d6=d7=d9=d10=d11=d4=x/2$$

$$d2=d8=0m$$

For enlargements, e.g. to increase the contact area or to determine the working width, d2 and d8 can be adjusted accordingly. All distances can be varied in the range>=0 m.

The mounting can be made of flexible material to achieve height adjustment by spring tension, especially in combination with electrical insulation.

Figure 3:
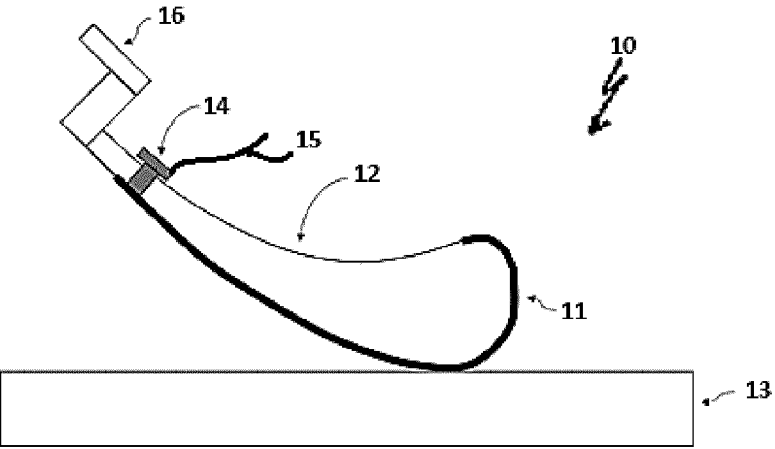

The example electrode 10 shown in FIG. 3 has a curved shape with curved surfaces 11, which reduces the edges. The flexible material 12, which is preferably an insulating material, allows movement in a vertical direction, which compensates for unevenness of the substrate 13 and at the same time ensures constant contact pressure in a defined range. The electrode is attached to the flexible material, e.g. by means of screws 14, to which a cable 15 can also be attached. The electrode can be mounted to a frame part by means of a further fastening device 16. The electrode is preferably drop-shaped.

Figure 4:
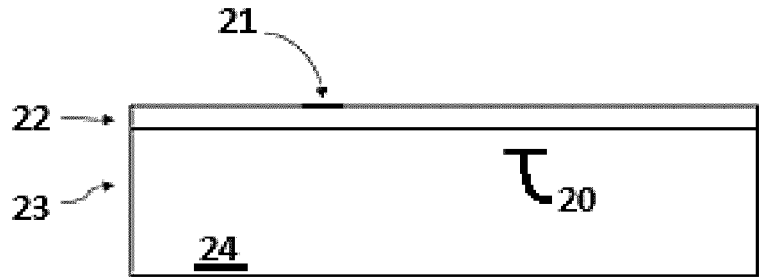

FIG. 4 shows the principle arrangement of a deep soil layer electrode 20. The current flow between electrodes 20 and 21, which is used e.g. for weed control, is adjusted. Layer 22 shows the vegetation with the plants and layer 23 shows the soil. The electrode 20 can be installed on the carrier vehicle as well as fixed to the ground or buried. When attached to the carrier vehicle, electrode 20 can have a high voltage insulation to the carrier vehicle.

A key factor for arcing is the potential difference between the high voltage electrodes 20 and 21 and the plants 22. To reduce the voltage of the electrodes, depth electrodes 20 can be used that are placed in the soil. In this way, the plant resistance and the resistance of the first soil layers 23 can be bypassed and thus the total resistance to be bridged is reduced. Lower soil layers 24 can also be contacted directly.

A current flow is set between the electrodes 20, 21. The deep electrode can be installed on the carrier vehicle as well as fixed stationary on or in the underground or buried.

Figure 5:
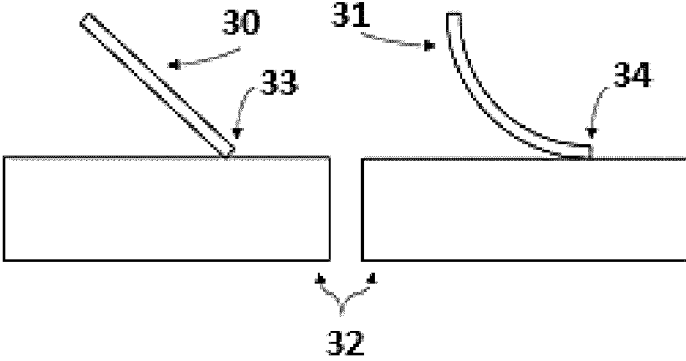

When a frame (not shown) with electrodes 30, 31 is lowered to the working height as shown in FIG. 5, electrodes 30, 31 are in contact with substrate 32. Due to the applied voltage and the fact that the electrodes are sheet metal, high local electric field strengths are generated at sheet edges 33, 34, which can lead to arcing on low-conductive substrates. At the ends of the electrodes 30, 31 an increased arcing is to be expected. A rigid electrode, as shown in FIG. 5 on the left side, favors arcing, while an electrode that rests against the floor, as shown on the right side, reduces the risk of arcing. Flexible electrodes that bend against the ground during installation are therefore preferred.

Figure 6:
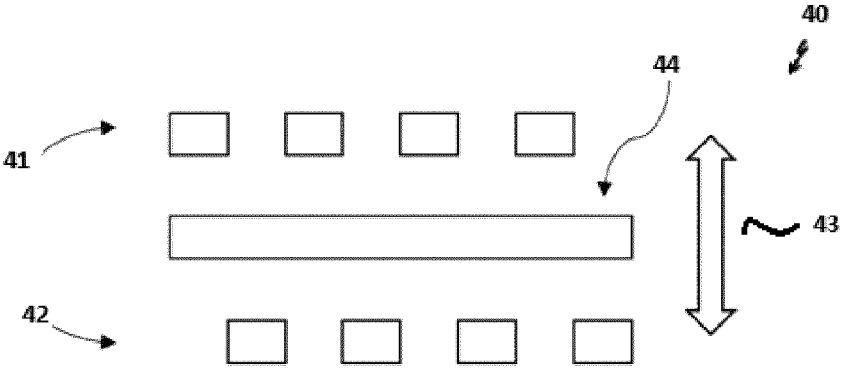

FIG. 6 shows an electrode arrangement 40 where the positive electrodes 41, 42 are separated and alternately arranged in the possible direction of travel 43 in front of and behind the bridged negative electrode 44. Each positive electrode 41, 42 is connected to an individually controlled power source (not shown). The distance of the positive electrodes 42, 42 from each other provides a high degree of electrical independence and thus a more uniform treatment result.

Figure 7:
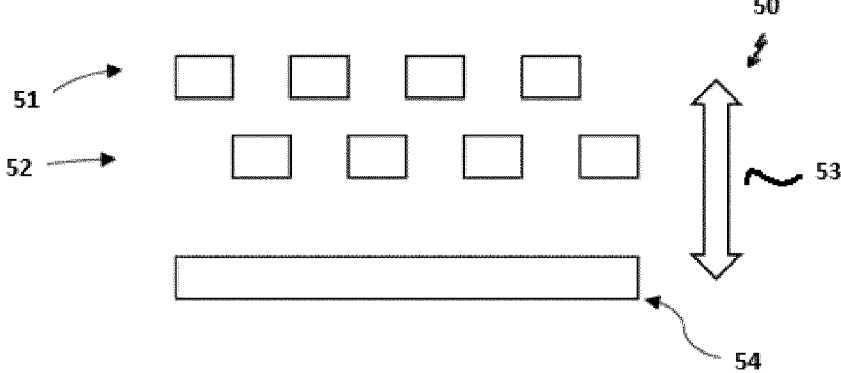
Figure 8:
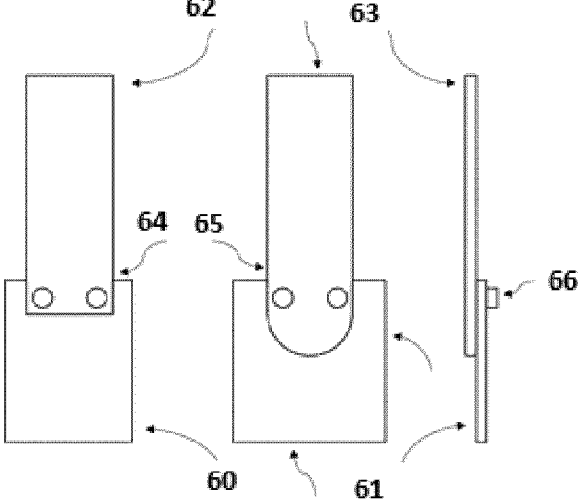

In case of critical space requirements, as in the case of the electrode arrangement 50 shown in FIG. 7, the ageing of the electrodes 51, 52 relative to the negative electrode 54 in direction of travel 53 can be dispensed with.

FIG. 8 shows an example of a non-linear field control. For this purpose, a material is used which changes to a more conductive state at high electric field strengths. This allows the higher local field strengths to be suppressed and lowered. For this purpose, a suitable material 62, 63 is attached to the end of the electrodes 60 and 61, which extends outwards over the electrodes 60, 61 and thus extends the arrangement. The transition 64 of material 62 to electrode 60 is angular and the transition 65 of material 63 to electrode 61 is rounded. The materials are joined, for example, with rivets 66.

Figure 9:
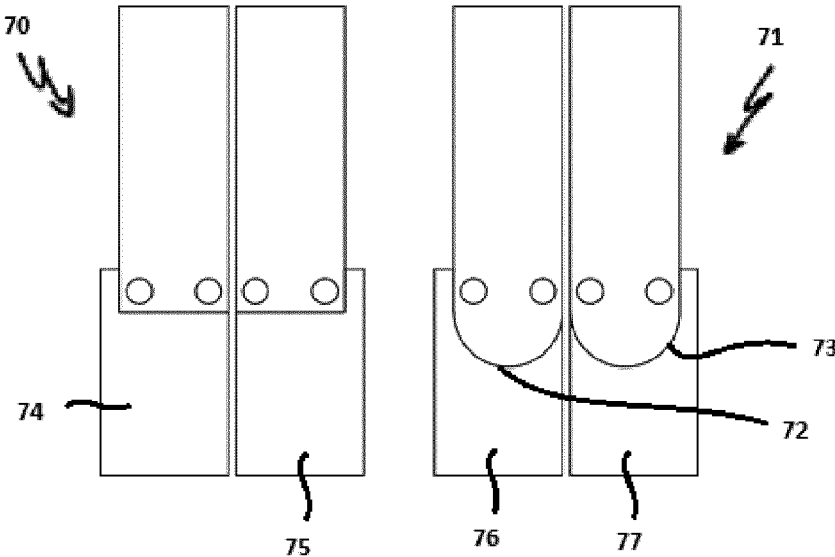

Accordingly, as shown in FIG. 9, a rounding 72, 73 can be used at the end of electrode 71 for split electrodes 70, 71 to reduce the number of edges of the arrangement. The field control element 74 to 77 is wider than the electrodes 70, 71 to homogenize possible lateral critical inhomogeneity's of the electric field.

At the end of electrodes 80, 81, several layers 82 to 84 of conductive material can be attached as shown in FIG. 10. With the help of these layers, the electrical potential can be successively reduced and thus lead to a homogenization of the electrical field strength. The nominal conductivity of the individual layers is gradually reduced ($\sigma1>\sigma2>\sigma2>\sigma3$). Non-linear material and a rounding at the end are particularly advantageous.

Figure 11:
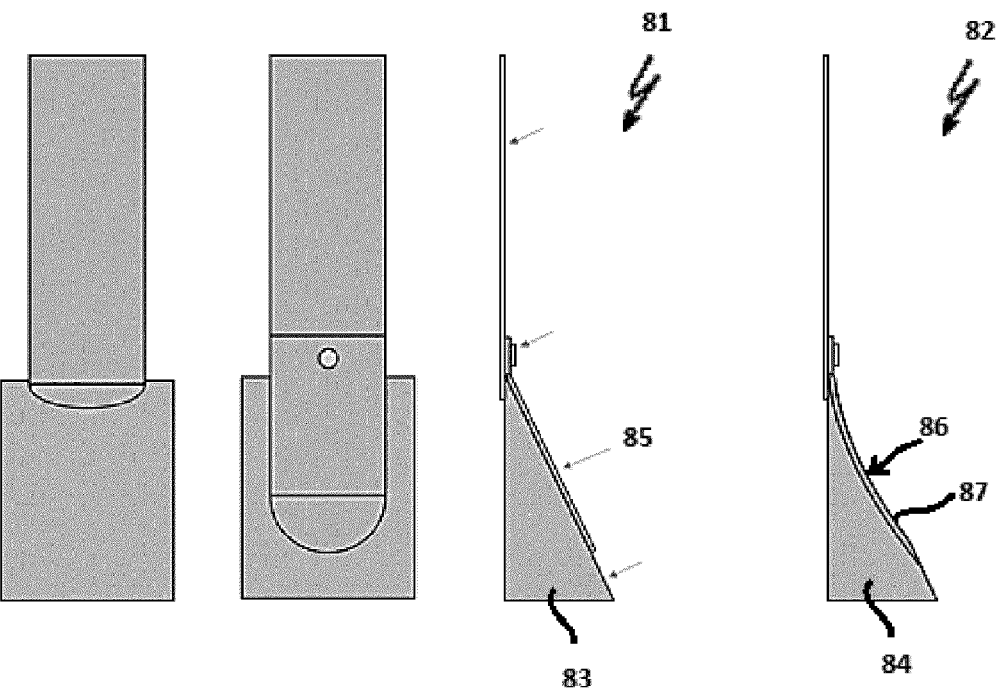

FIG. 11 shows how the electrode potential can be directed to the substrate by means of geometric field control. The geometrical shape stretches the potential and smoothes the electric field strength. A wedge-shaped conductive material 83, 84 is attached to the end of the electrodes 81 and 82. As a field control element, a further plate 85, 86 is attached to the wedge 83, 84, so that the distance to the substrate is continuously increasing. By using a curvature 87 (e.g. Rogowski profile) the electric field can be additionally homogenized.

Figure 12:
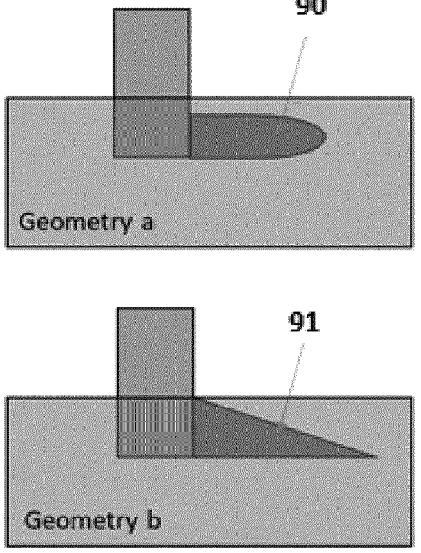
Figure 13:
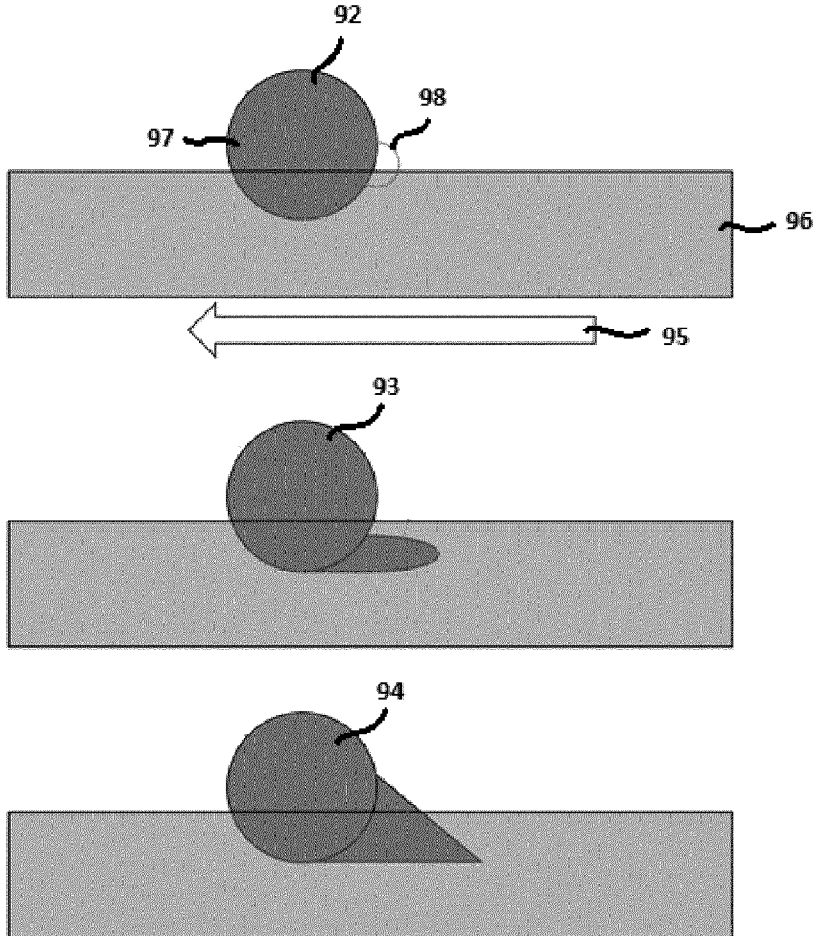

An electric field control for deep soil layer electrodes 90, 91 is shown in FIG. 12 and FIG. 13 shows an electric field control for cutting elements 92 to 94, such as slices. In the direction of movement a rotating or, as a cutting edge, a non-rotating disc 97 made of metal can be pulled through the soil 96. This creates a field with high electric field strength in the rear area 98 and there is a risk of electric arcs.

Figure 14:
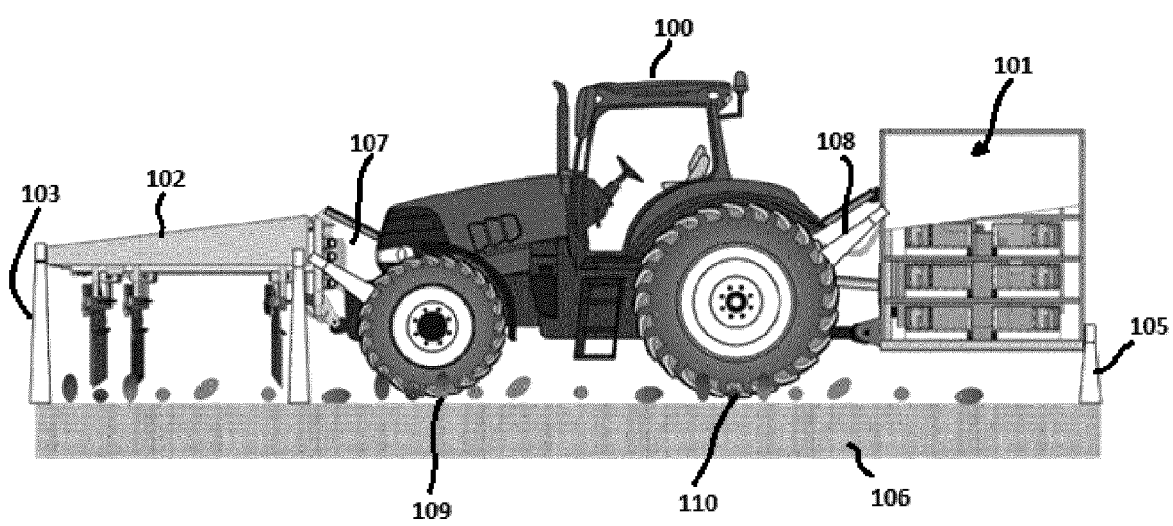

FIG. 14 shows five possible positions of the sensors on a tractor 100 with a power generation unit 101 and an applicator 102. Three exemplary positions 103, 104, 105 detect a relative movement on the ground 106. Two further positions 107 and 108 detect a relative movement of the tires 109 and 110. This has the advantage that possible ground movements, e.g. grasses moving in the wind, have no influence on the correct condition evaluation.

Figure 15:
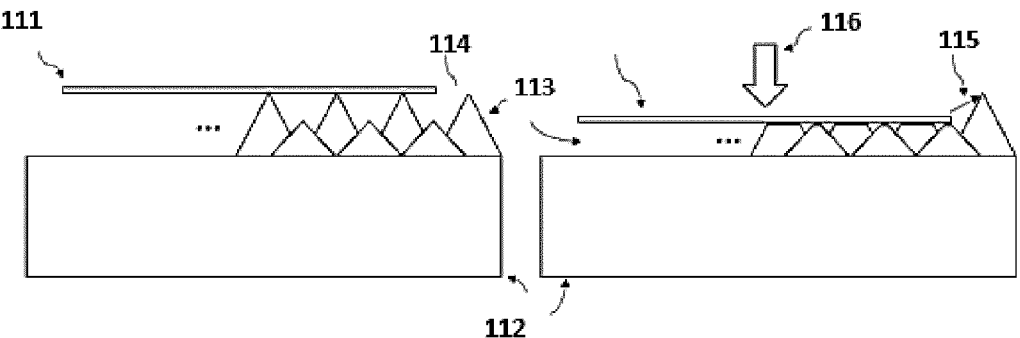
Figure 16:
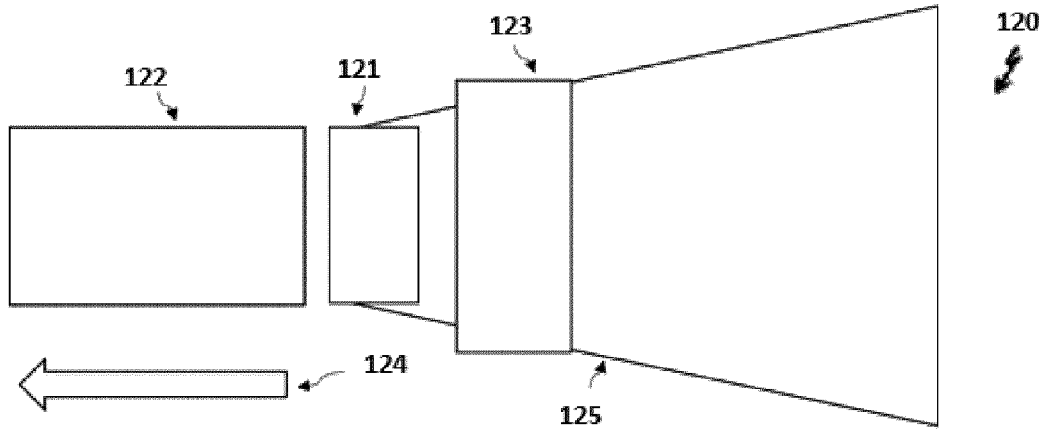

FIG. 15 shows an electrode 111 and schematically the plant as a whole system, including the carrier vehicle, which are in relative motion to substrate 112. The sliding contact is generally high-impedance and can determine the power output and thus the biological performance depending on the substrate. A high-impedance contact resistance generates a voltage between electrode and plant 113 (or substrate), which is the decisive parameter for arcing. By reducing the contact resistance, the local soil potential is increased and the voltage 114, 115 between electrode and plant is reduced. By applying a defined contact pressure 116 of the electrode 111 on the substrate 113, the contact resistance can be reduced and both the biological effect and the overall safety with regard to arcing and fire hazard can be improved. The reason for this is an increased effective contact area.

The local critical field strength can be reduced by increasing the contact pressure and/or by targeted mechanical destruction of the plants in order to improve the coupling of the electrode to the plant, as shown in FIG. 15.

FIGS. 16 to 19 show different arrangements 120, 130, 140, 150 of the extinguishing mats in relation to the application area, the carrier vehicle and the direction of travel. The application area results in a trapezoidal danger area for fires (3).

Figure 17:
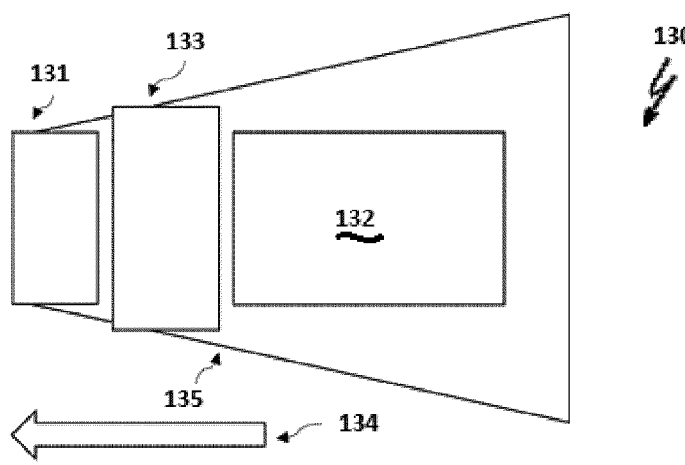

The high-voltage area is shown in FIG. 16 as applicator area 121 at the rear of the vehicle 122. Behind it is an extinguishing mat 123 and a danger area 125 in the direction of travel 124. In FIG. 17, the high-voltage area is attached to the front of the vehicle 132 as applicator area 131, while an extinguishing mat 133 is located directly behind the high-voltage area 131 in the direction of travel 134. The danger area 135 is thus partly located under the vehicle 132.

Figure 18:
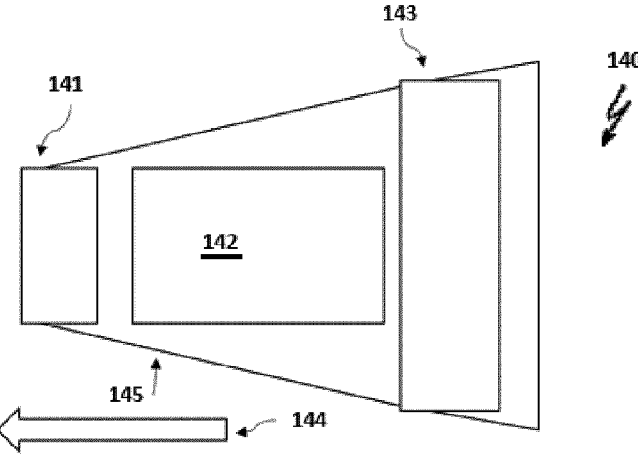
Figure 19:
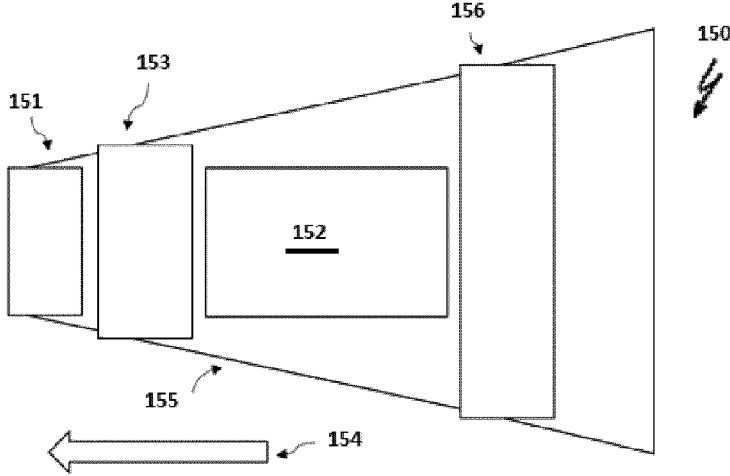

FIG. 18 shows a high-voltage area as applicator area 141 at the front of vehicle 142 and an extinguishing mat 143 in the direction of travel 144 behind vehicle 142. The danger area 145 therefore extends under the entire arrangement. FIG. 19 shows a high-voltage area as applicator area 151 at the front of the vehicle 151 and one fire extinguishing mat 153 and 156 each in direction of travel 154 in front of and behind the vehicle 152. Here, too, the danger area 155 extends under the entire arrangement.

Figure 20:
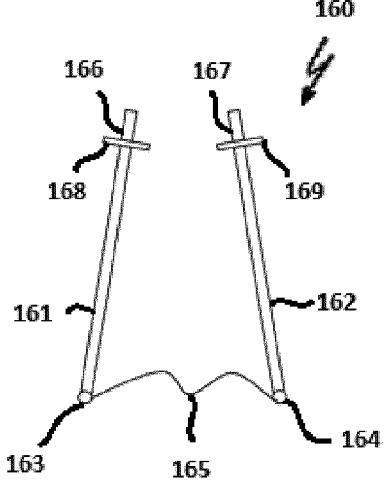

A version of a manually operated short circuit device 160 is shown in FIG. 20 and consists of two rods 161 and 162, which are made of electrically non-conductive material. These bars have two electrodes 163 and 164 at the ends and are connected by a cable 165. The ends of the rods 161 and 162 are designed as handles 166 and 167 and are limited by disks 168 and 169.

The invention claimed is:

1. A system for minimizing the risk of fire when treating a substrate comprising a soil with weeds using high-voltage electrodes wherein the system comprises:
   a vehicle;
   an applicator coupled to the vehicle;
   a plurality of electrodes coupled to the applicator;
   the system further comprising at least one fire-extinguishing mat configured to be in contact with the ground and drawn along the substrate in the direction of travel, said mat being placed behind the electrodes of the applicator in the direction of travel;
   wherein the mat is arranged to passively suppress residual ignition by suffocating any flames caused by arcing from the electrodes; and
   wherein the at least one mat has a width greater than the total width of the electrode arrangement and is positioned based on the direction of travel and the configuration of the vehicle and applicator, such that it covers the danger area after high-tension treatment.

2. The system according to claim 1, wherein both the applicator and the at least one mat are positioned behind or in front of the vehicle in the direction of travel, or
   the applicator is in front of the vehicle and the at least one mat is behind the vehicle in the direction of travel.

3. System according to claim 1 wherein the plurality of electrodes is in an arrangement comprising:
   two sets of positive pole electrodes and at least one negative pole electrode; and
   wherein each electrode of the two sets of positive pole electrodes are spaced apart and alternately arranged.

4. The system according to claim 1 wherein at least one electrode of the plurality of electrodes further comprises:
   a curved shape with curved surfaces,
   a flexible material allowing movement of the electrode in a vertical direction;
   a cable attached to a first fastening means;
   wherein each electrode is attached to the flexible material by the first fastening means;
   wherein the electrode can be mounted to a frame part by means of a second fastening means; and
   wherein the flexible material is also an insulating material.

5. The system according to claim 1 wherein each electrode further comprises:
   a rounded end to reduce the number of edges;
   a field control element attached to the electrode which is wider than the electrode;
   wherein the field control element comprises a plurality of layers of conductive material attached to each other.

6. The system according to claim 1 further comprising a sprayer for spraying a liquid onto the soil or weeds before, during or after the high-voltage treatment to prevent temperature increase.

7. System according to claim 1 wherein the system comprises at least one high voltage converter module electrically coupled to the electrodes;

a CPU electrically coupled to the high-voltage converter module further comprising:

at least one sensor for measuring electromagnetic signals in proximity to the electrodes;

wherein the system is configured to limit, reduce or switch-off at least one of current and voltage supplied to the electrodes upon detection of an event of partial discharge or arcing, and/or at least one speed sensor positioned in the vehicle to determine its speed relative to the ground.

8. The system according to claim 3, wherein the arrangement is such a way that one set of positive poles is in front and the other set of positive poles is behind the negative pole.

9. The system according to claim 3, wherein the arrangement is such a way that both sets of positive poles are arranged in front or behind the negative pole.

10. The system according to claim 8, wherein each electrode in the two sets of positive electrodes is connected to a respective power source, wherein each respective power source is individually controlled.

11. The system according to claim 4 wherein each electrode has a drop-like shape.

12. The system according to claim 5 wherein a nominal conductivity $\sigma$ of the individual layers is gradually reduced $\sigma 1 > \sigma 2 > \sigma 3$ and/or the individual layers comprise a non-linear material.

13. The system according to claim 5 wherein the field control element further comprises a plate in a curved shape.

\* \* \* \* \*